US010109210B2

United States Patent
Kitch et al.

(10) Patent No.: US 10,109,210 B2
(45) Date of Patent: Oct. 23, 2018

(54) EMBEDDABLE VIDEO PLAYING SYSTEM AND METHOD

(71) Applicants: Justin Shelby Kitch, Palo Alto, CA (US); John Paul Tokash, Pacifica, CA (US); Thai Duc Bui, Los Altos, CA (US)

(72) Inventors: Justin Shelby Kitch, Palo Alto, CA (US); John Paul Tokash, Pacifica, CA (US); Thai Duc Bui, Los Altos, CA (US)

( * ) Notice: Subject to any disclaimer, the term of this patent is extended or adjusted under 35 U.S.C. 154(b) by 0 days.

(21) Appl. No.: 13/624,581

(22) Filed: Sep. 21, 2012

(65) Prior Publication Data

US 2014/0087349 A1 Mar. 27, 2014

(51) Int. Cl.
*G06F 17/30* (2006.01)
*G09B 5/06* (2006.01)

(52) U.S. Cl.
CPC ............... *G09B 5/06* (2013.01); *G09B 5/065* (2013.01)

(58) Field of Classification Search
CPC ................................ G06F 17/30; H04L 41/509
USPC ................................................... 434/308
See application file for complete search history.

(56) References Cited

U.S. PATENT DOCUMENTS

| 6,099,320 A * | 8/2000 | Papadopoulos ......... G09B 5/14 345/418 |
| 2005/0003330 A1* | 1/2005 | Asgarinejad et al. .......... 434/20 |
| 2007/0134640 A1* | 6/2007 | Masaoka ................ G06Q 30/02 434/323 |
| 2007/0250899 A1* | 10/2007 | Rhodes et al. ................ 725/136 |
| 2009/0055857 A1* | 2/2009 | Gatz ............................. 725/32 |
| 2010/0141655 A1* | 6/2010 | Belinsky et al. ............ 345/440 |
| 2010/0198876 A1* | 8/2010 | Estok ................ G06F 17/30038 707/793 |
| 2012/0077175 A1* | 3/2012 | Levisay ................... G09B 7/02 434/322 |
| 2013/0011121 A1 | 1/2013 | Forsyth et al. |

* cited by examiner

*Primary Examiner* — Thomas Hong
(74) *Attorney, Agent, or Firm* — NWAMU, P.C.

(57) ABSTRACT

An embeddable video playing system and method. A user interface executing the method generates a display window for displaying video content to teach a course. The course includes a plurality of selectable lessons. The method displays a play control to play the video content and control bars to play several time-coded segments associated with the lesson. The method might also display an embedded exercise link, file attachment link and communication interface link.

7 Claims, 16 Drawing Sheets

─ 550

Recipe | Sourdough starter

Starter:
    *Ingredients:*
        *5 cups water*
        *2 large potatoes (Yukon Gold potatoes work well)*
        *2 tbs salt*
        *2 tbs honey*
        *4 cups white flour*

*You'll also need: a saucepan, large mixing spoon, strainer, large mixing bowl, and basket to cover the mixing bowl*

FIG. 5B

EMBEDDABLE VIDEO PLAYING SYSTEM AND METHOD

COMPUTER PROGRAM LISTING APPENDIX

A computer program listing appendix is provided via EFS with this application. The information is hereby incorporated by reference as if set forth in full in this application for all purposes. A portion of the disclosure recited in this application contains material which is subject to copyright protection. Specifically, the computer program listing appendix and possibly other portions of the application may recite or contain source code, data or other functional text. The copyright owner has no objection to the facsimile reproduction of the functional text; otherwise all copyright rights are reserved.

BACKGROUND OF THE INVENTION

The present invention relates generally to computer information and communication systems and methods and more specifically to computer information and communication systems and methods for curating video content and using embeddable video players for viewing said video content.

One fundamental human trait is our desire to continue learning. We might want to learn for personal reasons, for reasons related to work or for other reasons. As an example, a user might want to learn how to play the guitar. As another example, a user might wish to improve the user's understanding of a particular technology.

The Internet has made it particularly convenient to learn by providing flexibility and convenience. Specifically, users can learn conveniently at home or long distance without dedicating extended and contiguous time periods to the learning process.

A user wishing to utilize the Internet to learn the guitar, for example, can begin by using a search engine to conduct a search. The typical "how to play the guitar" search would reveal numerous selectable documents, videos and the like—some pertinent others irrelevant. The user is then faced with a conundrum as to where to begin given such numerous search results. Even after selecting a document, the user would often spend time and effort reading only to discover that the document is only peripherally related.

The user would then abandon document reading and proceed to viewing of video content on the desired subject matter. Upon selecting and playing a video, the user might discover portions that are irrelevant.

The user would then fast forward, sometimes rewinding, endlessly searching the video for more relevant information. After that, the user would proceed to the next video, and if time permits, to another video. After viewing videos for an extended duration, the user would discover that the only knowledge acquired is no more than a vague understanding of "how to play the guitar."

It is within the aforementioned context that a need for the present invention has arisen. Thus, there is a need to address one or more of the foregoing disadvantages of conventional systems and methods, and the present invention meets this need.

BRIEF SUMMARY OF THE INVENTION

Various aspects of an embeddable video playing system and method can be found in exemplary embodiments of the present invention.

In a first embodiment, an embeddable video player employs a user interface window to play video content for teaching a course. In response to user selection, the embeddable video player plays a first lesson in the display window for viewing by the user. Here, the first lesson might be segmented into several time-coded sections. Each time-coded section is distinct and can identify a subtopic or key concept associated with the first lesson.

Each time-coded section can also be independently selected to play the subtopic associated with that time-coded section. Unlike conventional video systems, users need not endlessly fast forward or continuously search video content for relevant sections, as a user can quickly identify the time-coded section for a desired topic. The identified time-coded section is then playable using a control bar for that time-coded section. Each time segment is high-lightable and identifiable for user selection. The entirety of the embeddable video player interface is rich, intuitive and significantly increases user experience.

In another embodiment, each lesson or time-coded section is embedded with a quiz or exercise that tests the user's knowledge of the subtopic covered by the section, thus, affirming the user's understanding of a lesson subject matter unlike conventional systems and methods. In a further embodiment, each lesson also includes a communication interface allowing user communication with teachers and content providers; the lesson also provides a file attachment link, wherein upon user selection, the attached file is displayed for viewing.

In a further embodiment, the embeddable video playing system and method comprises a user interface executing a method on a processing platform that includes a processor, user input device, a display and memory. The method (1) generates a display window for displaying video content received from a server; the method further (2) displays a play control to play the video content responsive to user input; (3) displays a plurality of control bars associated with several time-coded segments; and (4) upon selection of a control bar, plays the time-coded segment associated with the control bar until conclusion of the time-coded segment or the lesson.

A further understanding of the nature and advantages of the present invention herein may be realized by reference to the remaining portions of the specification and the attached drawings. Further features and advantages of the present invention, as well as the structure and operation of various embodiments of the present invention, are described in detail below with respect to the accompanying drawings. In the drawings, the same reference numbers indicate identical or functionally similar elements.

BRIEF DESCRIPTION OF THE DRAWINGS

FIG. 5B illustrates contents of an attachment according to an exemplary embodiment of the present invention.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth to provide a thorough understanding of the present invention. However, it will be obvious to one of ordinary skill in the art that the present invention may be practiced without these specific details. In other instances, well-known methods, procedures, components, and circuits have not been described in detail as to not unnecessarily obscure aspects of the present invention.

An example of a website for implementing the system and method of the present invention is locatable at www.curious.com. The term "website" is generally applicable to a method for downloading/uploading and should not be construed as being limited to content downloaded/uploaded via Internet or HTTP (HyperText Transmission Protocol). Note also that server-performed functionality can also be performed on the client side as well.

Figure 1:
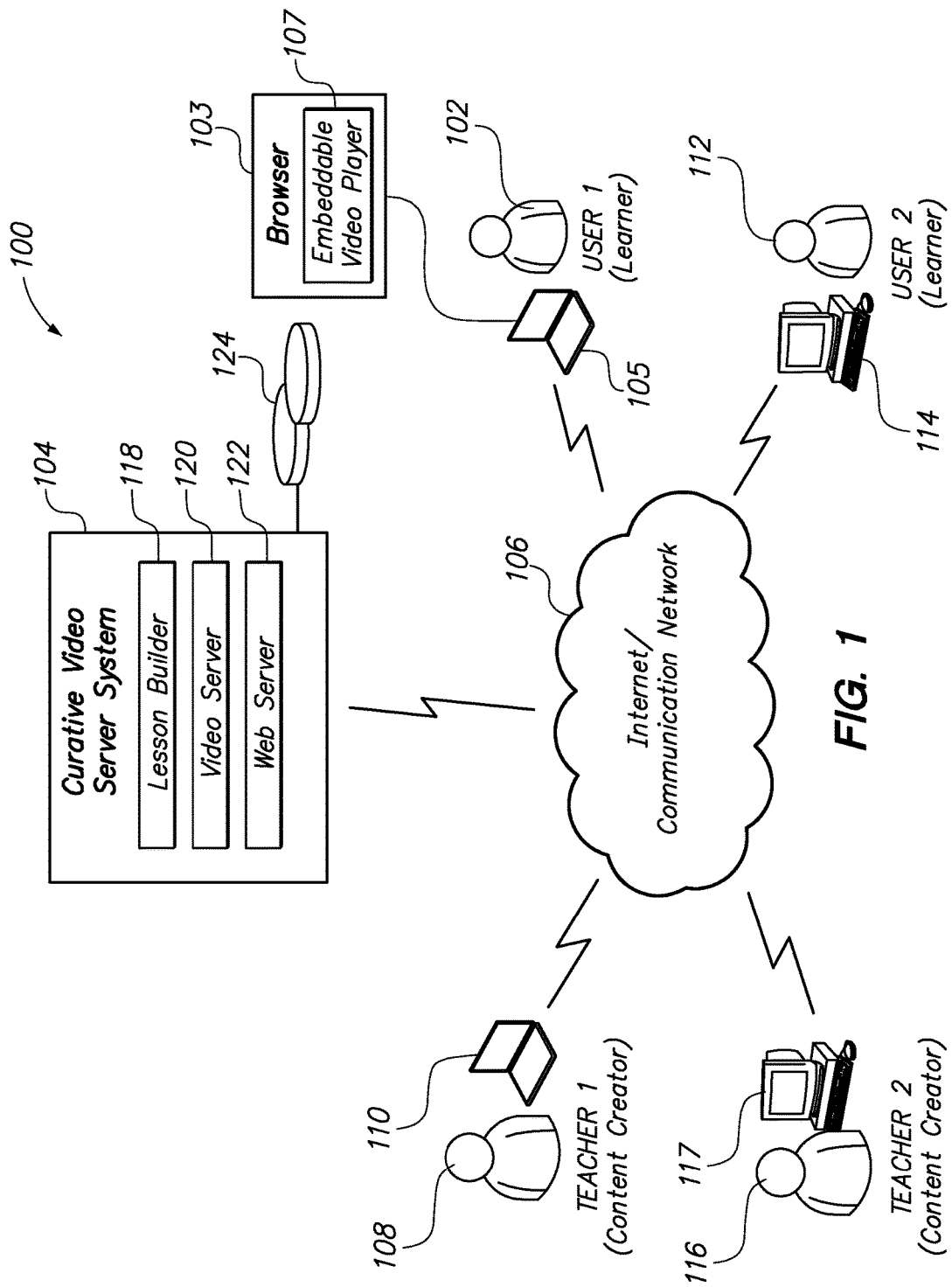
FIG. 1 illustrates a curative video communication system according to an exemplary embodiment of the present invention.

FIG. 1 illustrates curative video communication system 100 according to an exemplary embodiment of the present invention.

In FIG. 1, curative video communication system 100 comprises, among other components, a learner or user 102 communicably coupled to curative video server system 104 via Internet/communication network 106. Internet/communication network 106 can be any network, wireless or wired, whether direct or indirect that allows data communication from one point to another.

As shown, curative video communication system 100 further comprises a content creator such as teacher 108 also communicably coupled to curative video server system 104 via Internet/communication network 106. Here, teacher 108 might be a skilled individual, an expert or any entity that is skilled in any subject matter and who wishes to use video content to teach that subject matter.

Teacher 108 produces such video content to impart knowledge about subject matter on which teacher is skilled. For example, teacher 108 might produce video content on playing the guitar. As another example, teacher 108 might be an expert sourdough baker teaching the fine art of sourdough bread baking.

Once video content is produced, teacher 108 can then utilize client laptop 110 for uploading of the video content to curative video server system 104. As will be further discussed, curative video server system 104 can then be employed for curating the video unlike conventional online video systems in which the video content is simply deposited for online viewing by users like user 102.

User 102 might be an individual seeking to improve his or her understanding of a particular subject matter. Thus, user 102 can be a student, a homemaker, a worker, etc. Using client laptop 105, user 102 can access curative video server system 104 to retrieve video content for the desired subject matter. Similarly, in FIG. 1, another learner such as user 112 can use client laptop 114 to access curative video server system 104.

In FIG. 1, another content creator such as teacher 116 can also use client desktop 117 to upload video content to curative video server system 104, said video content being accessible to both user 102 and user 112. In this manner, the present invention provides a unique, distributed curative video teaching and learning system that matches teachers and learners not hereinbefore available or seen in conventional systems.

Content creators such as teacher 108 and teacher 116 can provide content and be matched with consumers such as user 102 and user 112. Video content is associated with specific subject matter so that users 102 and 112 need not spend invaluable amounts of time searching for video content that does not match their needs. As will be further described, an embodiment of the embeddable video player of the present invention displays video content that is time-coded into sections so that users can quickly identify and proceed to relevant sections of a lesson video.

Referring now to FIG. 1, curative video server system 104 includes lesson builder 118, video server 120 and web server 122. Although shown separately as a server cluster, one skilled in the art will realize that the functionality of all of the servers can be provided by a single server.

Here, web server 122 serves up web pages through which media content can be accessed by users 102 and 112. Such video content might be accessible, for example, at www.curious.com. Video server 120 retrieves available video content from database 124 for streaming or downloading to users 102 and 112. One skilled in the art will realize that video server 120 may include additional functionality.

Lesson builder 118 curates video content received from teachers for distribution to users. In accordance with unique aspects of the present invention, lesson builder 118 can divide video content into a plurality of lessons, each lesson being segmented into time-coded sections that are complete subsections or chapters related to a subtopic of the lesson. Other advantages of the present invention (e.g. embedded attachments, etc.) are further described below with reference to the following paragraphs.

After curation of content, lesson builder 118 might then generate one or more code instructions comprising embeddable video player 107 for downloading to client laptop 105. User 102 can then employ embeddable video player 107 for viewing the video content. Note that the task of generating one or more instructions for embeddable video player 107 need not be performed by lesson builder 118. Operation of curative video communication system 100 will now be described.

In use, content creator or teacher 108, for example, may desire to create a lesson on a subject matter in which teacher 108 is skilled. For example, teacher 108 can create a lesson on playing the guitar, making sourdough bread, building a house, on philosophy, on particular humanities, Java coding, etc.

Teacher 108 begins by creating a video on playing the guitar, for example. Teacher 108 is not limited to a single lesson but can produce multiple or a plurality of lessons as part of a single course. Teacher 108 begins by using a recording device such as a video camera, a camera phone or other like to create the guitar lesson video.

The guitar lesson video is recorded or converted into a Web-readable format such as MPEG-4, etc. Upon completion, teacher 108 uses a web browser (not shown) on client laptop 110 to upload the guitar video lesson to curative video server system 104. The guitar lesson video is then stored in database 124. At this point, teacher 108 can then access the video content for curation.

By curating, it is meant that lesson builder 118 is used to add, delete, format, re-format, etc., in a manner that improves usability and functionality of the uploaded video content in accordance with the spirit and scope of the present invention. In one embodiment, teacher 108 uses lesson builder 118 to curate the uploaded video by for example segmenting the lesson video into time-coded sections that identify separate sections of the video lesson. In other embodiments, the video lesson may also be curated by hanging attachments or exercises on the video frames and by providing overlay animation. Once curated, the guitar lesson video (or video clips) is cataloged and stored in database 124 for access by users.

User 102, wishing to become more proficient at playing the guitar, begins by firing up browser 103 in client laptop 105 to send an HTTP request for the guitar lesson video. Preliminarily, user 102 would have to register and log into the curative video server system 104 website. Once logged in, user 102 can browse available video content and then locate the desired guitar video lesson after which the HTTP request is sent.

Browser 103 can typically interpret traditional HTML (Hypertext Markup Language), although any comparable markup language consistent with the spirit and scope of the present invention can be used. The HTTP request is sent to a website (not shown) hosted by web server 122 of curative video server system 104.

In response, in one embodiment, web server 122 returns a guitar lesson web page (not shown) to browser 103. In one embodiment, the guitar lesson web page is embedded with embeddable video player 107. Embeddable video player 107 may include embedded scripts or applications that can play the guitar lesson video in conjunction with a player plug-in (not shown) residing on client laptop 105. An example of such a player plug-in might be Shockwave Flash available from Adobe, Inc., of San Jose, Calif.

One skilled in the art will realize that the present invention is also applicable to other computing type devices that have browsers and the like. Thus, although not shown, client laptop 105 may be tablet, mobile communication device, etc. In that case, such a device would utilize some other video player such as that incorporated in HTML 5.

The embedded scripts might be JavaScript and/or ActionScript. One skilled in the art will recognize that other comparable code can be employed. The ActionScript code is executed by the browser plug-in to play one or more portions of the guitar lesson video. The embedded applications might comprise JavaScript code including data retrieval applications for retrieving text for populating a portion of the guitar lesson web page, the address of JPEG images, the name of video files, the format of individual video files, etc.

In one embodiment, the guitar lesson web page is displayed in a display window comprising two sections: a main display section for displaying the video itself and a secondary or menu window for displaying a plurality of lessons that comprise the guitar video course. The main display window includes a play button that, once selected, enables the user to continue to use embeddable video player 107 and the browser plug-in for playing the selected guitar video lesson.

One of ordinary skill in the art will realize that the guitar lesson need not be played in a display window comprising two sections. Thus, although not shown, the guitar lesson web page may be displayed in a single display window. Lessons might be selected from the single display window and played therein as well.

Figure 2:
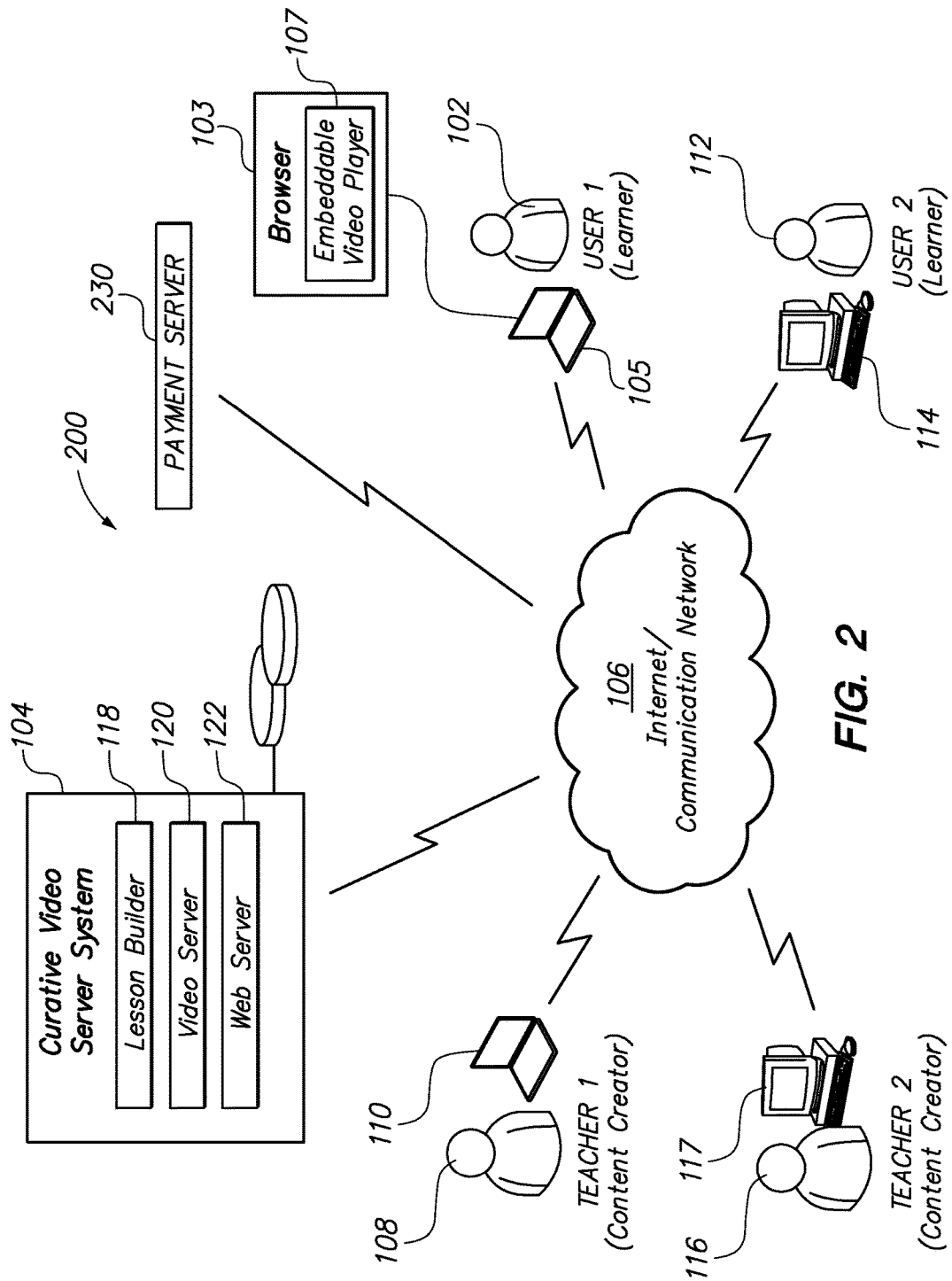
FIG. 2 illustrates a curative video communication system in accordance with an exemplary embodiment of the present invention.

FIG. 2 illustrates curative video communication system 200 in accordance with an exemplary embodiment of the present invention.

In FIG. 2, curative video communication system 200 comprises payment server 230 in addition to components discussed with reference to FIG. 1. Although not shown, payment server 230 may itself be integrated with curative video server system 104. Payment server 230 automatically debits user accounts to pay for access to video content in accordance with charges determined by content creators and/or curative video server system 104. In this manner, the present invention provides a novel and significant distribution channel that matches content creators and content users and automatically secures payments for content creators for videos consumed by content users. Embeddable video player interface screenshots for various lessons will now be discussed with reference to FIGS. 3-11 below.

Figure 3:
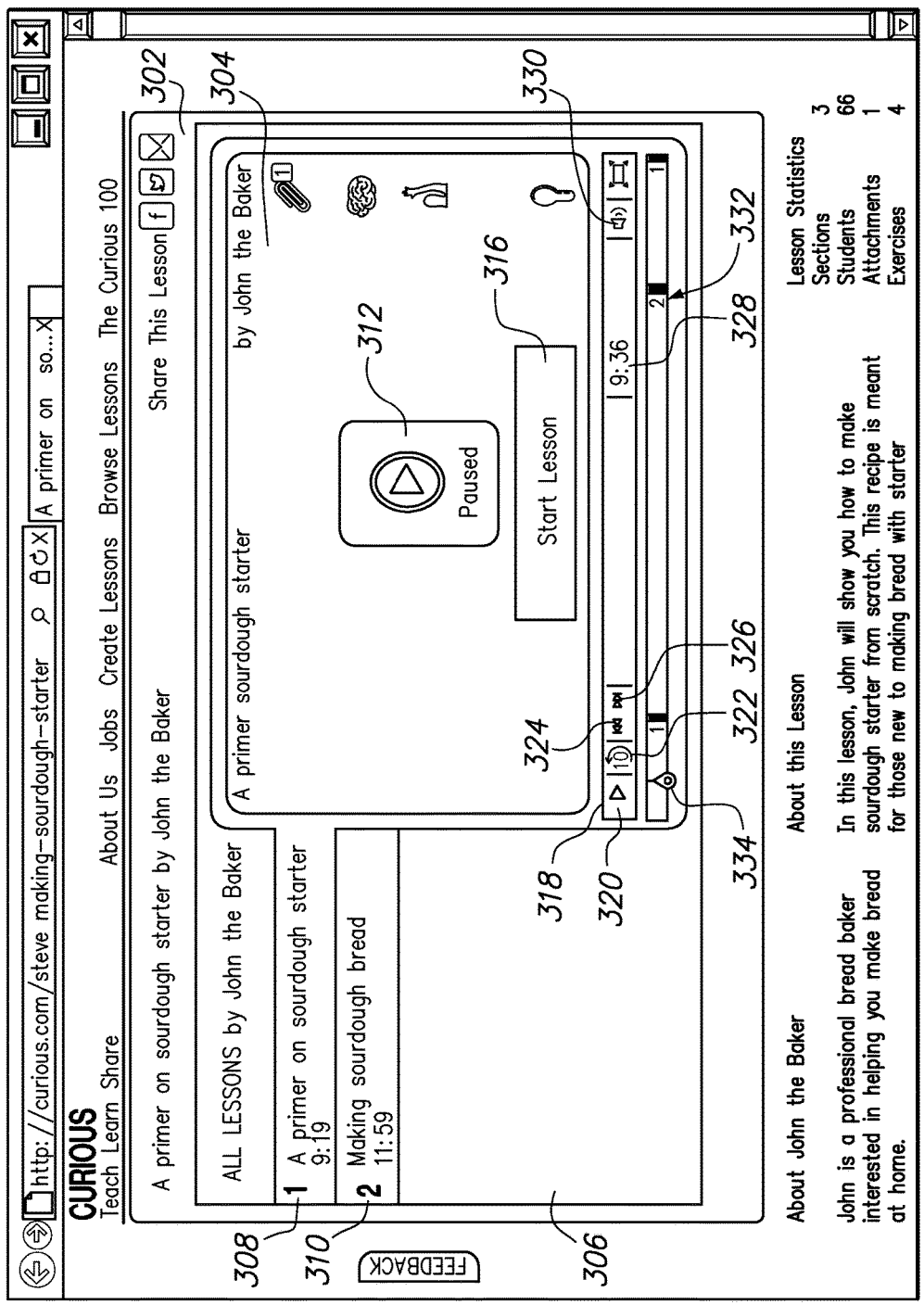
FIG. 3 illustrates a video player "start lesson" interface screenshot according to an exemplary embodiment of the present invention.

FIG. 3 illustrates a video player "start lesson" interface screenshot 300 according to an exemplary embodiment of the present invention.

In FIG. 3, "start lesson" interface screenshot 300 shows the beginning of a course teaching the finer details of sourdough bread making. Specifically, the first lesson, "A primer on sourdough starter," is shown. A course teaches subject matter for a particular topic. A course can include one or lessons that teach a subtopic or section of the course.

In FIG. 3, "start lesson" interface screenshot 300 comprises display window 302 including a main or video display window 304 for displaying video content for the course and a secondary or lesson list menu window 306 for displaying a plurality of lessons that are available for the course. In one embodiment, the length and height and the aspect ratio of display window 302 can be varied consistent with the spirit and scope of the present invention.

As shown, within lesson list menu window 306, the lessons available for the course are "A primer on sourdough starter" 308 and "Making Sourdough Bread" 310. One skilled in the art would realize that more or fewer lessons may be available and displayed within lesson list menu window 306 as needed to accomplish the objectives of the course.

Video display window 304 displays video content for lessons selected in lesson list menu window 306. For example, if "A primer on sourdough starter" 308 is selected, video content for that lesson is displayed in video display window 304.

Note that when a lesson is selected, the lesson in lesson list menu window 306 and the periphery of video display window 304 are highlighted. In this manner, an intuitive interface is presented that allows user 102 to recognize that a selected lesson is being played.

In FIG. 3, video display window 304 comprises play button 312, start button 316, either of which can be used to initiate the video lesson. Video display window 304 also includes video control bar 318 displayed upon hover by a user input device. Here, video control bar 318 includes play/pause button 320, 10-second rewind button 322, previous section button 324, next section button 326, a timer button 328 and a volume slider 330.

Video display window 304 also includes timeline 332 and progress indicator 334. As implied by its name, timeline 332 shows the lesson video frames over time, while progress indicator 334 advances over timeline 332 as the lesson video is played.

Figure 4:
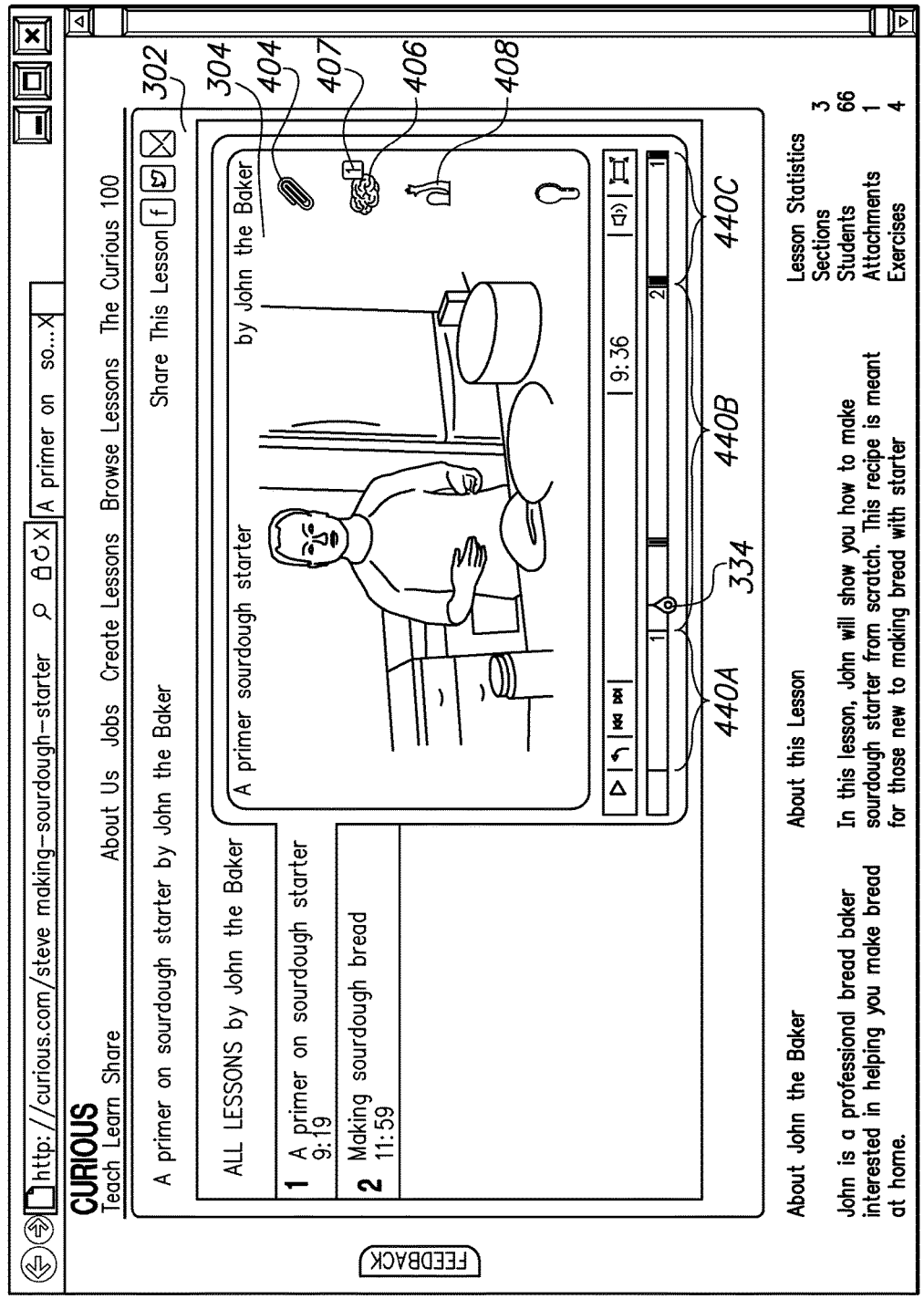
FIG. 4 illustrates a "lesson in progress" interface screenshot according to an exemplary embodiment of the present invention.

To initiate the "A primer on sourdough starter" lesson video 308, user 102 selects play button 312, start button 316 or play/pause button 320 after which the lesson video begins to play as referenced in FIG. 4.

FIG. 4 illustrates "lesson in progress" interface screenshot 400 according to an exemplary embodiment of the present invention.

In FIG. 4, specifically, "lesson in progress" interface screenshot 400 illustrates the progress of the "A primer on sourdough starter" lesson of FIG. 3 over timeline 332. Herein is another advantage of the present invention. Timeline 332 is segmented into a plurality of time-coded sections 440A, 440B and 440C. In one embodiment, each respective time-coded section is based on a subtopic of the lesson. That is, each subtopic is related to the topic of the lesson. In an alternate embodiment, each time-coded section is based on a theme.

In one embodiment, each time-coded section is associated with a single video file. By selecting a particular time-coded section, the video file associated with the time-coded section is played. For example, when user 102 plays time-coded section 440A, the player streams or downloads and plays the video file associated with time-coded section 440A.

In FIG. 4, "lesson in progress" interface screenshot 400 also includes a plurality of selectable icons namely paperclip icon 404, brain icon 406 and raised hand icon 408. Any one of said aforementioned icons can be selected while the lesson is in progress to view or take advantage of the functionality offered by the icons.

Upon selecting paperclip icon 404, user 102 can access embedded documents referenced in the lesson or access external Internet Web links. Such attachments might be video files, images and the like. For example, user 102 can access a sourdough recipe shown in FIG. 5B.

This ability to embed items such as documents that can be accessed at any time during video play is another benefit of the present invention. Unlike conventional video lessons that display documents during video play so that the document is no longer viewable after the video frame has played, user 102 need only select paperclip icon 404 at any time during lesson play to access the desired document or link.

In FIG. 4, user 102 can access a plurality of exercises by selecting brain icon 406. The exercises are designed to test the knowledge of the material previously viewed with reference to the particular time-coded section.

This is but another advantage of the present invention. Unlike conventional systems, the present invention allows users to test their knowledge of particular time-coded sections on a section-by-section basis. Most learning occurs by testing what was previously learned to determine what is retained and what is understood.

As can be seen here, attached to brain icon 406 is number of exercises 407 indicating the number of exercises available for the particular time-coded section. Here, number of exercise 407 is "2". Exercises are further discussed with reference to FIG. 8 below.

In FIG. 4, user 102 can communicate with teachers to ask a question by selecting raised hand icon 408. User 102 can also make a suggestion to content providers or express emotions about a lesson as further discussed with reference to FIG. 10 below. These are but some of the advantages of the present invention over conventional systems and methods.

Figure 5A:
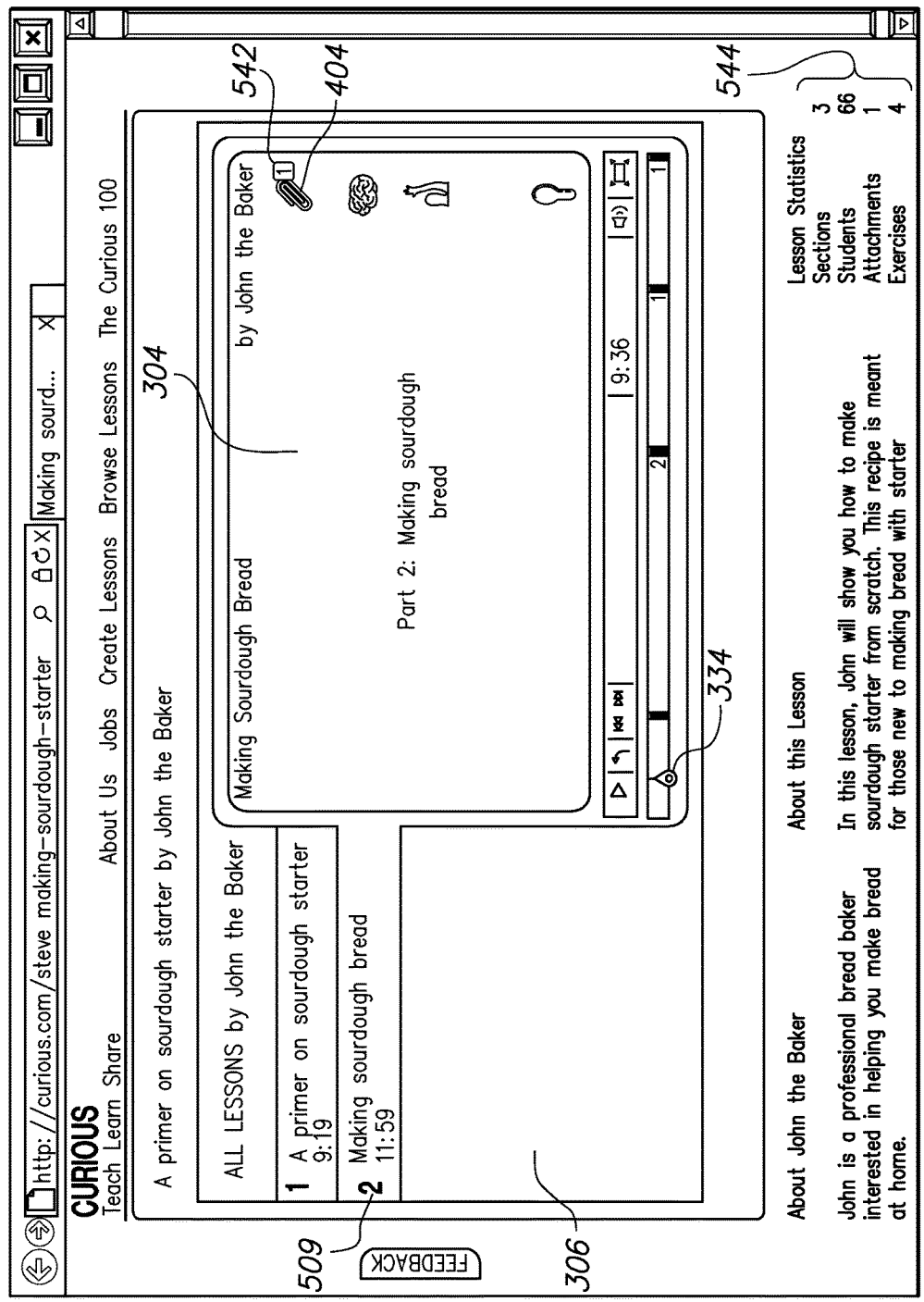
FIG. 5A illustrates a video player "start lesson" interface screenshot 500 according to an exemplary embodiment of the present invention.

FIG. 5A illustrates a video player "start lesson" interface screenshot 500 according to an exemplary embodiment of the present invention.

In FIG. 5A, "start lesson" interface screenshot 500 shows the beginning of "Part 2: Making sourdough bread" which is displayed upon conclusion of the "A primer on sourdough starter" lesson of FIG. 4. Thus, each lesson is played, and upon termination, the next lesson is scheduled to begin. In one embodiment, the next lesson is played without waiting for user 102 to enter a play command. In an alternate embodiment, the next lesson commences after user 102 enters a play command.

In FIG. 5A, the scheduled lesson is "Part 2: Making sourdough bread" 509 as shown in lesson list menu window 306. Here, the number "2" indicates that this is the second lesson. Thus, each course is divided into a plurality of lessons that are numbered and played consecutively.

Upon selection of "Part 2: Making sourdough bread" 509, the video display window 304 begins to play the lesson. The area around the selected lesson in lesson list menu window 306 and the area around the video display window 304 are both highlighted so that the lesson being played in the video display screen window 304 is identifiable.

Although not shown, each lesson is selectable and can be played independently of other lessons. Thus, two or more lessons can be played at the same time independent of each lesson.

Note here that progress indicator 334 is shown at the beginning of the lesson indicating that the lesson is yet to start. Note also that number of attachments 542 is displayed adjacent to paperclip icon 404. Number of attachments 542 indicates the number of items in each time-coded segment (other than the introduction segment) that can be accessed by selecting paperclip icon 404. Here, number of items 542 is "1" indicating that only a single item can be accessed.

In FIG. 5A, the present invention also makes available lesson statistics 544 that show information about the number of sections, the number of students, the number of attachments and the number of exercises for the current lesson.

FIG. 5B illustrates attachment 500 according to an exemplary embodiment of the present invention in which the attached file is a sourdough starter recipe.

Figure 6:
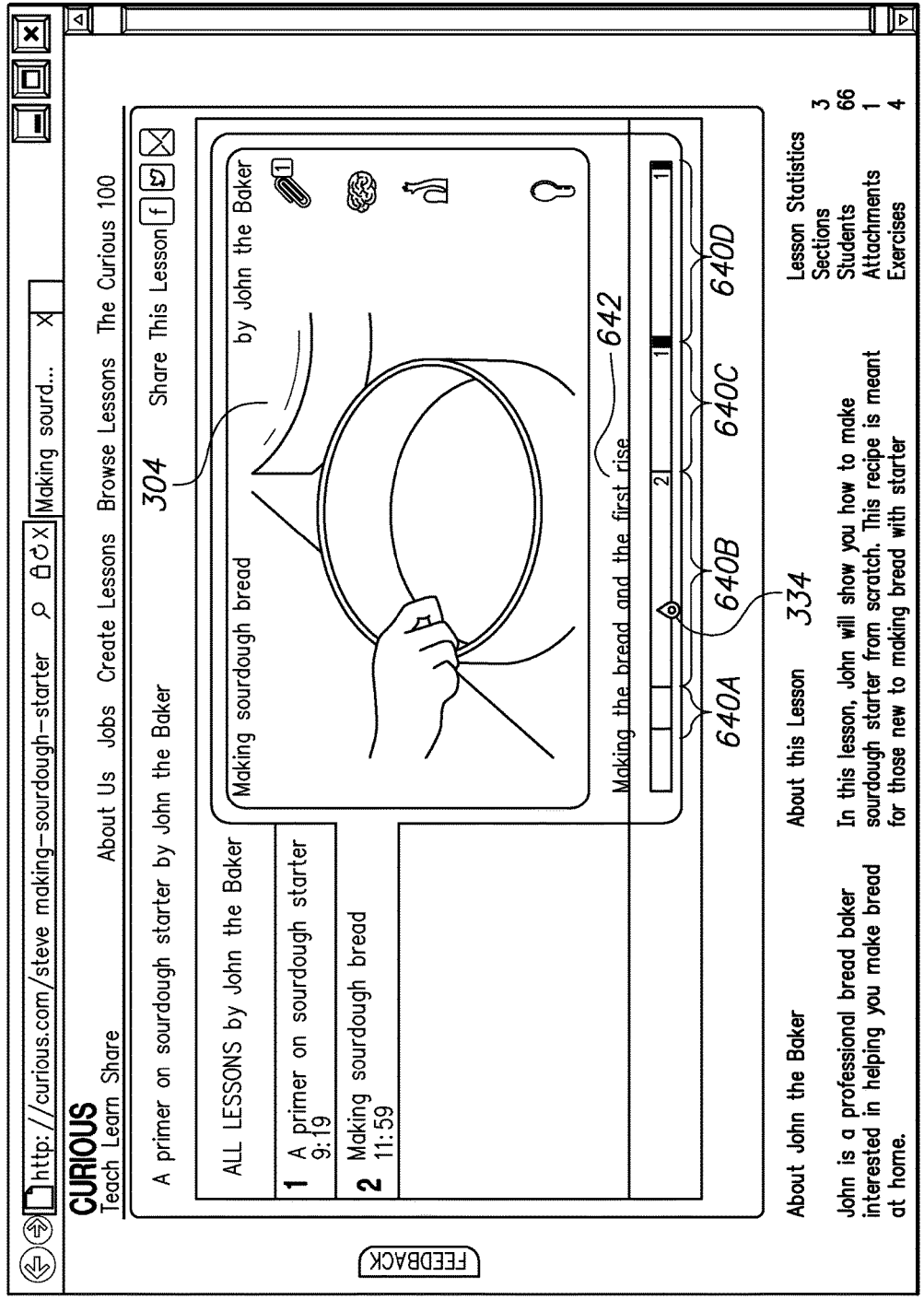
FIG. 6 illustrates a video player "lesson in progress" interface screenshot according to an exemplary embodiment of the present invention.

FIG. 6 illustrates a video player "lesson in progress" interface screenshot 600 according to an exemplary embodiment of the present invention.

In FIG. 6, "lesson in progress" interface screenshot 600 shows the "Making sourdough bread" lesson in progress. The teacher can be observed mixing the sourdough for the bread in a bowl as the lesson progresses.

In FIG. 6, progress indicator 334 has reached time-coded section 640B. The lesson is divided into time-coded sections 640A, 640B, 640C and 640D. Each time-coded second is displayed and played consecutively one after the other. As shown, time-coded section 640B is highlighted to indicate that the lesson is currently on that section. Moreover, when user 102 hovers over time-coded section 640B, title or subtopic 642 for that section is displayed. As can be seen, the title or subtopic for time-coded section 640B is "Making the bread and the first rise."

By displaying the title or subtopic for the particular lesson, users can easily access and identify any particular time-coded section. Thus, upon a mouse-over event on any given time-coded section, the title of that section is displayed above or adjacent to the corresponding time-coded section. In this manner, unlike conventional systems, the user need not continuously search a video backwards and forwards to locate a desired section. If user 102 wishes to review a particular section, the user can simply select that section based on the displayed topic.

Note that when user 102 wishes to select a time-coded section different from the one being played, user 102 can simply click on the desired time-coded section. This initial selection causes the time-coded section to play from the start. If user 102 wishes to begin play at a later starting point of that time-coded section, user 102 can then select or click the desired starting point on that time-coded section (or progress bar). This second action moves progress indicator and causes play to begin from the later starting point.

Figure 7:
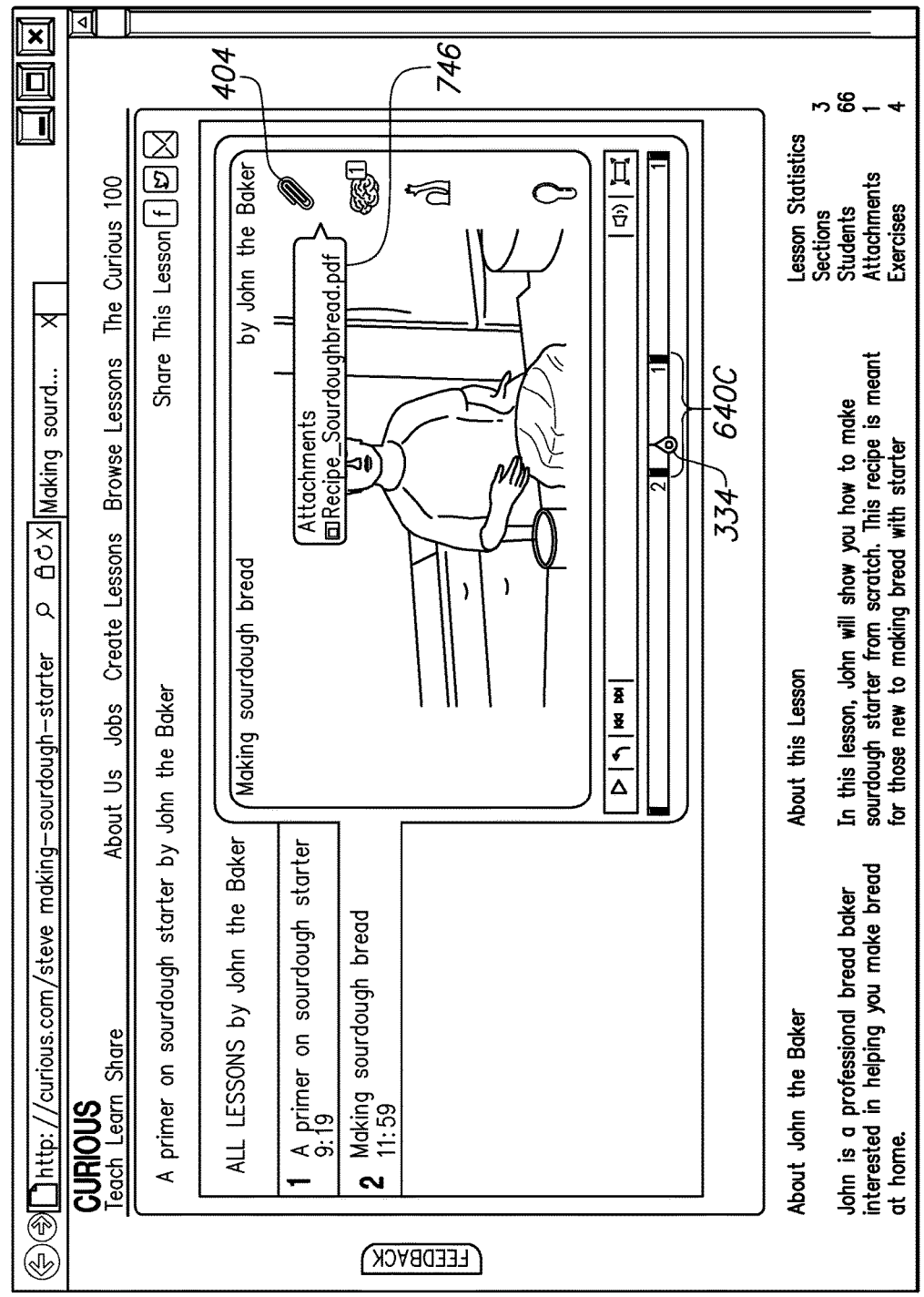
FIG. 7 illustrates a "lesson in progress" interface screenshot with attachment according to an exemplary embodiment of the present invention.

FIG. 7 illustrates "lesson in progress" interface screenshot 700 with attachment according to an exemplary embodiment of the present invention.

In FIG. 7, user 102 has hovered over paperclip icon 404. Responsive thereof, popup 746 is displayed. Popup 746 identifies the attachments that are associated with paperclip icon 404. As can be seen as well, progress indicator 334 has progressed to time-coded section 640C.

Figure 8:
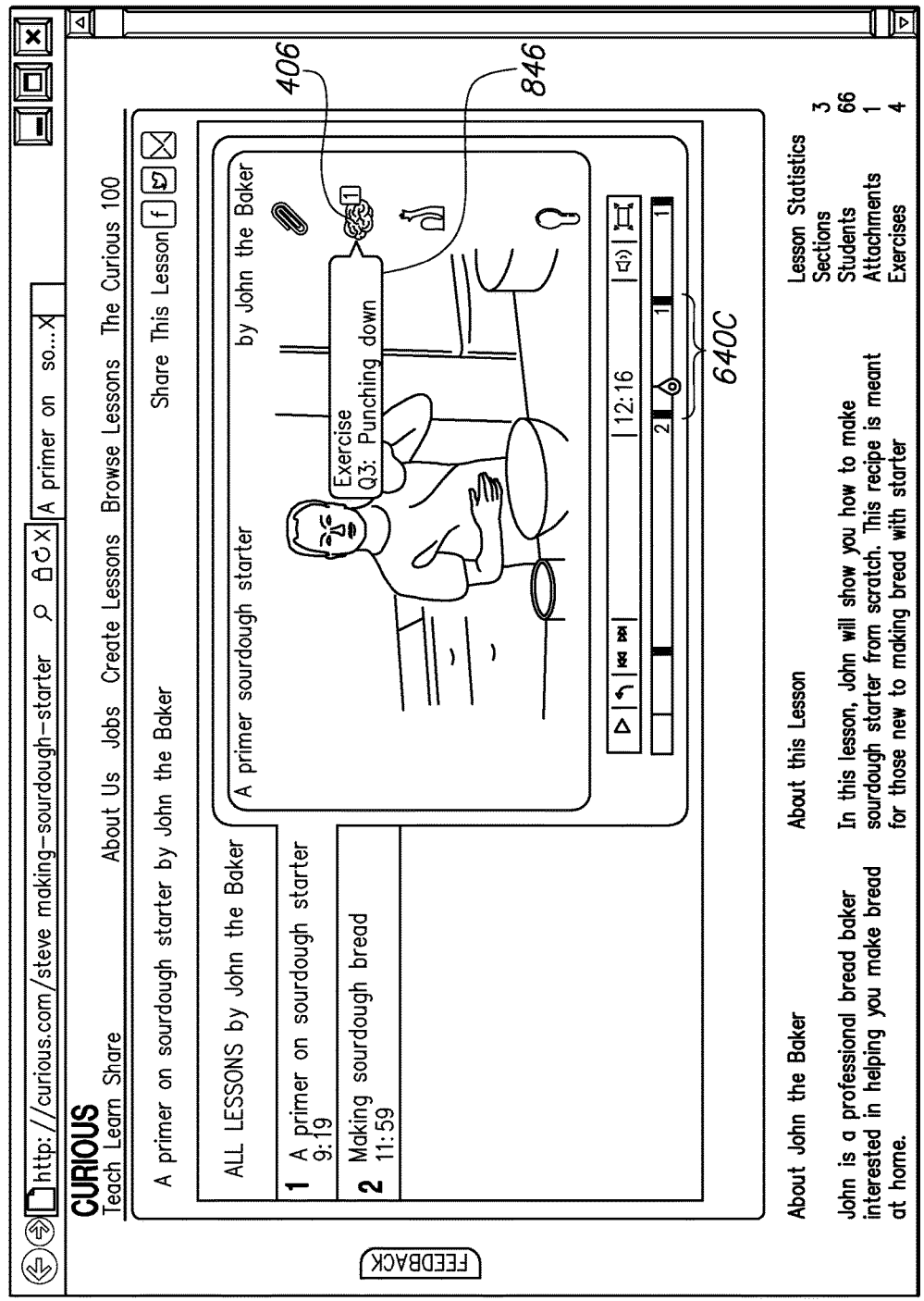
FIG. 8 illustrates a "lesson in progress" interface screenshot with exercises according to an exemplary embodiment of the present invention.

FIG. 8 illustrates "lesson in progress" interface screenshot 800 with exercises according to an exemplary embodiment of the present invention.

In FIG. 8, "lesson in progress" interface screenshot 800 shows popup 846 with exercises. When user 102 hovers over brain icon 406, popup 846 is displayed showing the number of exercises associated with the current time-coded section 640C. Here, as shown, the number of exercises is one ("Punching down").

Figure 9:
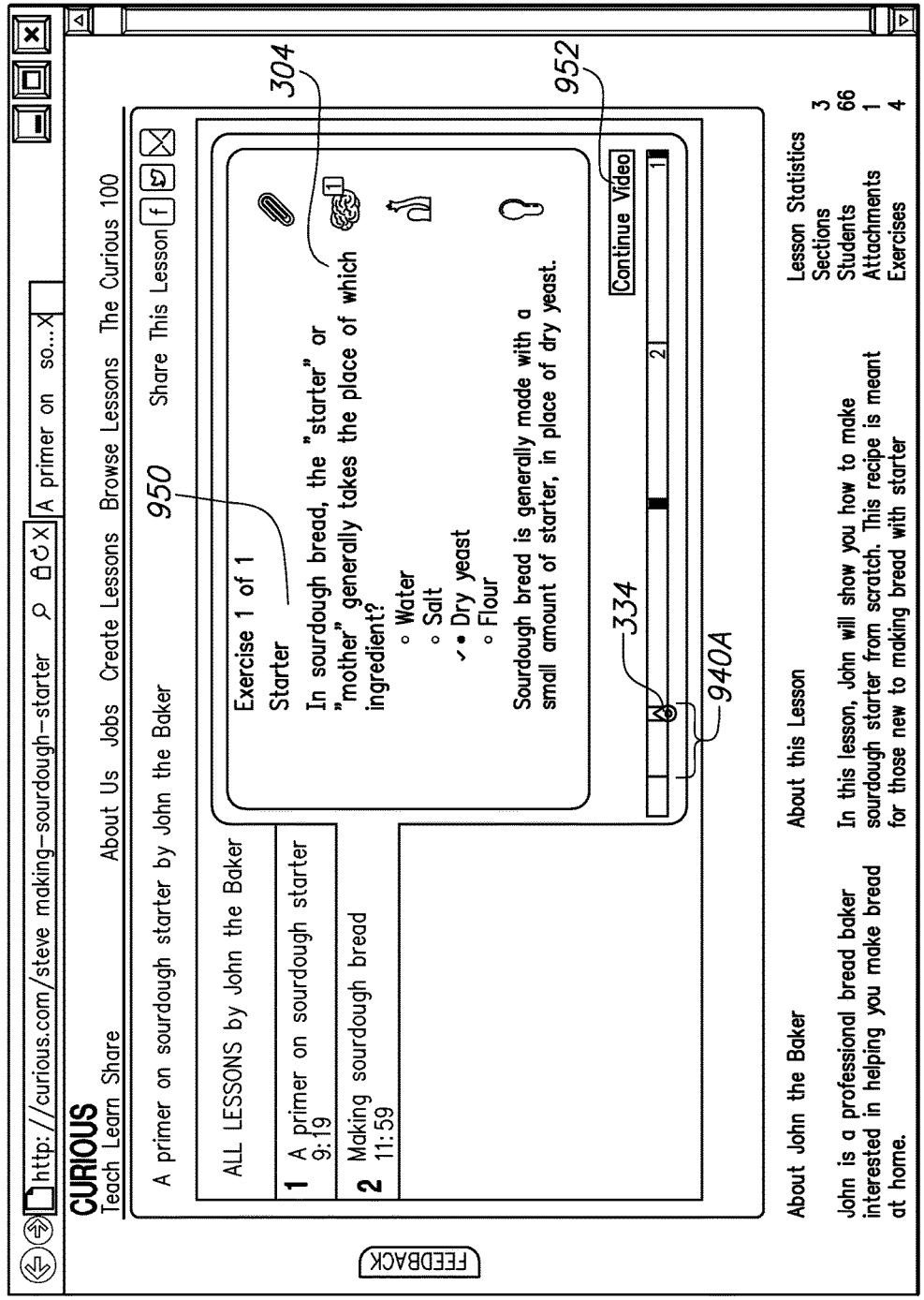
FIG. 9 illustrates an exercise interface screenshot according to an exemplary embodiment of the present invention.

FIG. 9 illustrates exercise interface screenshot 900 according to an exemplary embodiment of the present invention.

In FIG. 9, specifically, exercise interface screenshot 900 shows an exercise entitled "Starter" 950 being displayed in video display window 304. Exercises that test a learner's understanding may be embedded into one or more time-coded sections. The typical exercise is displayed at the end of the time-coded section since it makes sense to test a learner's knowledge upon conclusion of the exercise. User 102 is prompted to answer questions asked by the exercise, and upon answering the questions, the user can select a continue video button 952 to proceed to the next section.

In FIG. 9, specifically, starter exercise 950 is displayed upon conclusion of time-coded section 940A, as indicated by progress indicator 334. Starter exercise 950, as shown, tests whether "in sourdough bread, the "starter" or "mother" generally takes the place of which ingredient?" The user is provided with four choices namely 1) water 2) salt 3) yeast and 4) flour. The correct answer is "dry yeast," which user 102 has selected. Upon selecting the right answer, continue video button 952 is displayed. Upon selection of said continue video button 952, the lesson progresses to the next time-coded section.

Figure 10A:
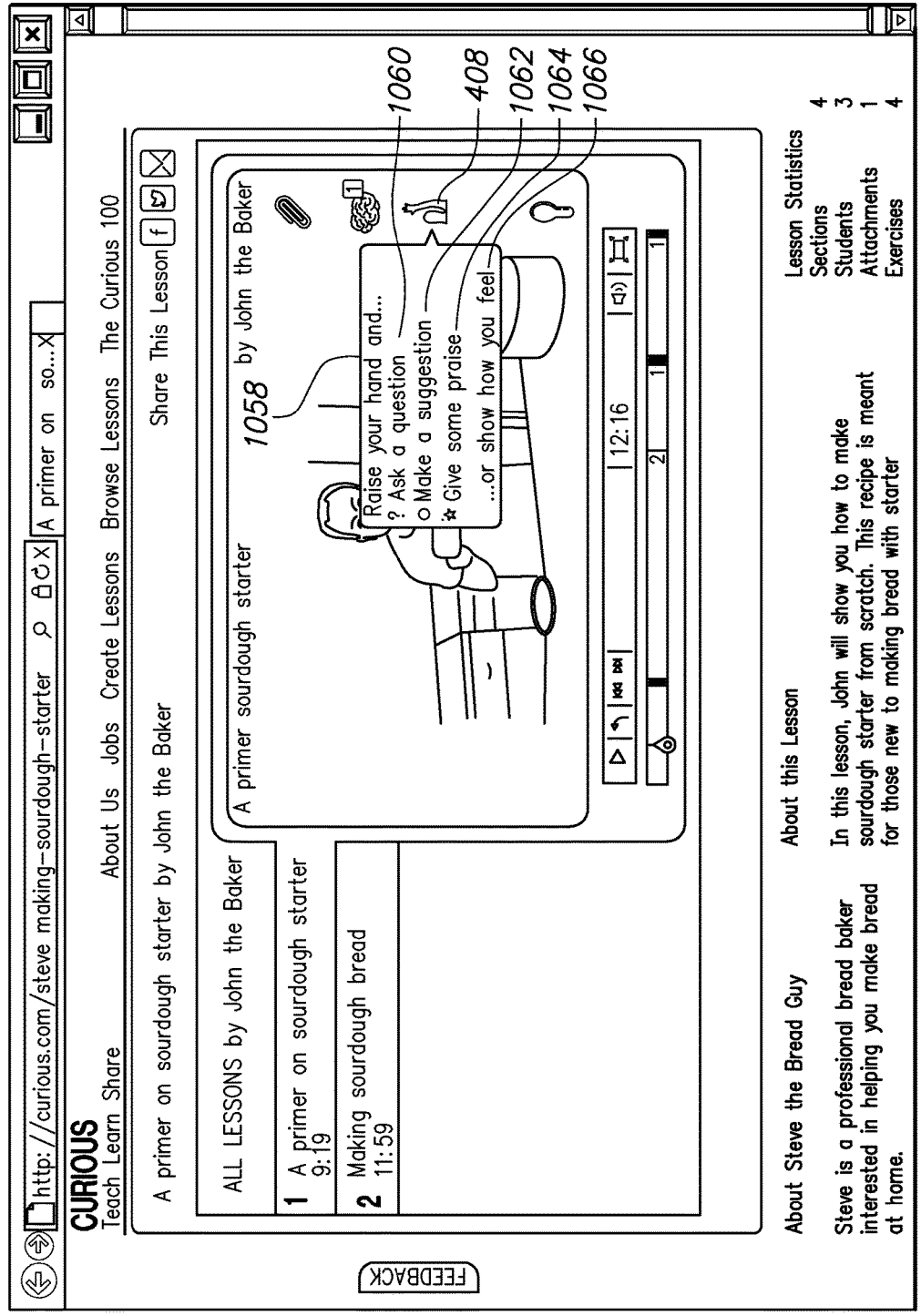
FIG. 10A illustrates a "lesson in progress" interface screenshot with user communication according to an exemplary embodiment of the present invention.

FIG. 10A illustrates "lesson in progress" interface screenshot 1000 with user communication according to an exemplary embodiment of the present invention.

In FIG. 10, "lesson in progress" interface screenshot 1000 shows user communication popup 1058 that allows user 102 to communicate with teachers, content providers and the like.

Communication popup 1058 is displayed when user 102 hovers over raised hand icon 408. Upon display of communication popup 1058, user 102 is presented with various menu items. User 102 can select "Ask a question" 1060 or "Make a suggestion" 1062 or "Give some praise" 1064. User 102 can also select "Show how you feel" 1066.

Upon selection of "Show how you feel" 1066, user 102 can insert one or more emoticons into a message that is then communicated to the content provider. By selecting "Ask a question" 1060, user 102 can communicate directly with teacher 108, for example. Herein is another advantage of the present invention. Unlike conventional video lessons, user 102 can communicate, sometimes in real time, with teacher 108 and/or content providers.

User 102 can ask questions about the lesson, and in turn, teacher 108 can respond. In fact, teacher 108 can view the progress of user 102 during the lesson. As is well known, students always have questions. And, students may need certain concepts clarified that may have been overlooked by teachers. Unlike the present invention, students viewing a conventional video system understand that such a conventional system is static and not interactive. Thus, in such conventional systems, students cannot ask questions, neither can they clarify concepts and are limited to one way dissemination of information from teacher to student. Unlike conventional systems, an embodiment of the present invention provides a system not herein before seen, the system promoting active learning by providing interactivity between students and teachers.

In FIG. 10A, by selecting "Make a suggestion" 1062, user 102 can communicate with the content providers or teachers to make a suggestion, for example, a suggestion on ways to improve a particular course. Upon selection of "Give some praise" 1064, user 102 can provide praise to teachers and content providers.

Figure 10B:
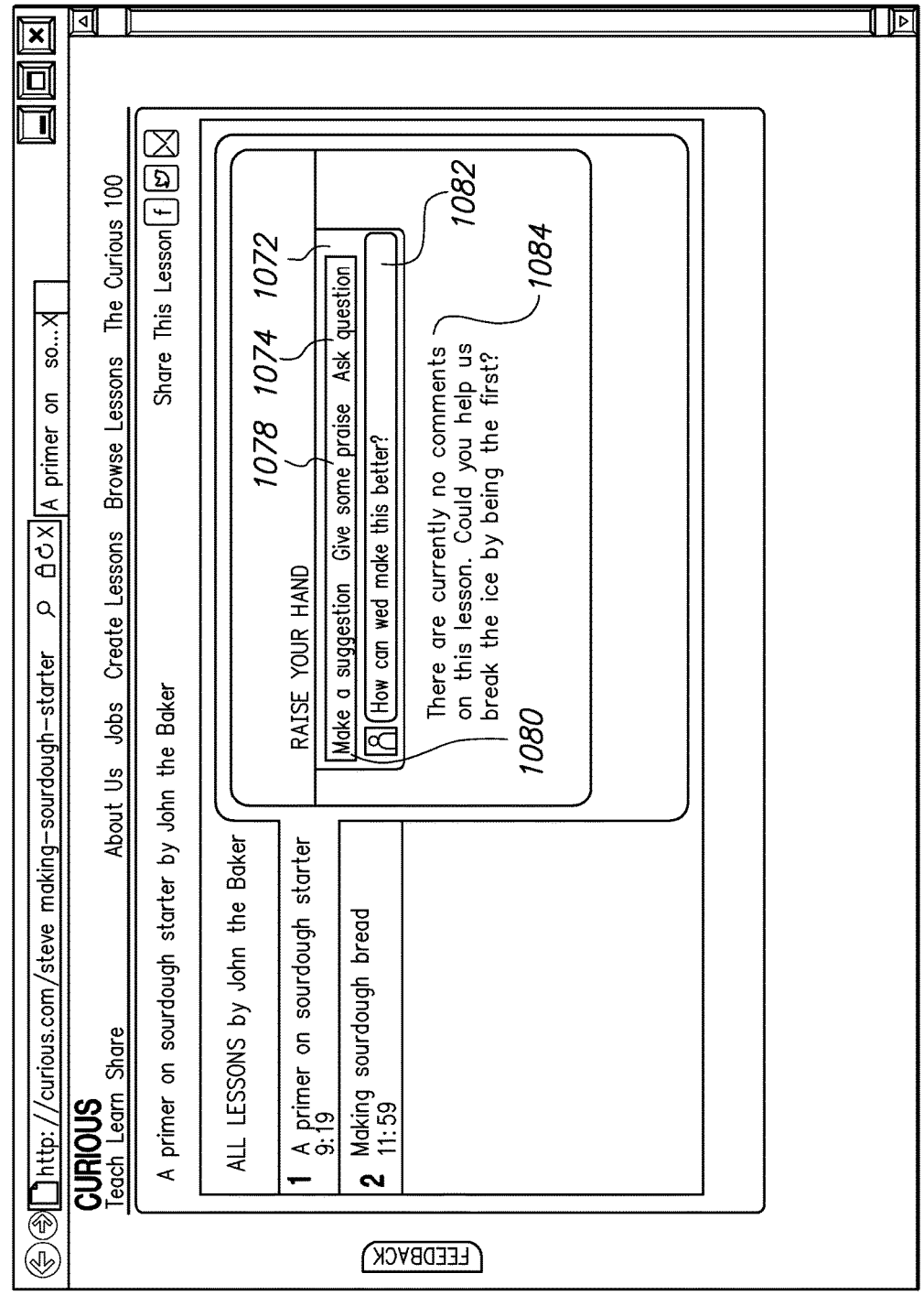
FIG. 10B illustrates "raise your hand" interface screenshot according to an exemplary embodiment of the present invention.

FIG. 10B illustrates "RAISE YOUR HAND (RYH)" interface screenshot 1070 according to an exemplary embodiment of the present invention.

In FIG. 10B, RYH interface screenshot 1070 specifically illustrates dialog box 1072 displayed when user 102, in FIG. 10A, selects "Ask a question" 1060, "Make a suggestion" 1062 or "Give some praise" 1064.

In FIG. 10B, dialog box 1072 itself has four areas namely "Ask a question" selection area 1074, "Give some praise" selection area 1078, "Make a suggestion" selection area 1080 and text box 1082. Upon hovering over "Ask a question" selection area 1074, that area is temporality selected and highlighted, and upon selection is permanently highlighted to distinguish the selected area from non-selected areas.

Contemporaneously, a user prompt message is displayed (grayed out) in text box 1082. The user prompt message might encourage the user to enter the desired question. For example, the user prompt message might be "Ask away, we will do our best to clear up any confusion."

User 102 then enters a question, inquiry, comment, etc. into text box 1082 that is then communicated to the lesson teacher or appropriate content provider. Note that other users may respond to questions asked by user 102. Similarly, upon hovering over "Give some praise" selection area 1078 or "Make a suggestion" selection area 1080, the selected area is highlighted and user 102 can enter a message in text box 1082 for forwarding to content provider.

In FIG. 10B, comment area 1084 is also illustrated. It is within this area that student comments about the course or lesson can be displayed. Here, as can be seen, there are currently no comments for this lesson. Although not shown, users can provide comments about a lesson. As noted, in one embodiment, the comments might be, make a suggestion, give some praise or ask a question. Indications of the total number of comments for a lesson can be provided to users as well. A user can then read the comments as the user progresses through the lesson.

Replies to such comments can also be provided by other users. Thus, a hierarchy of comments and replies can be built around a lesson or course where all of the comments are displayed and, in one embodiment, the comments are sorted based on the type of comment (make a suggestion, give some praise, ask a question).

Figure 11:
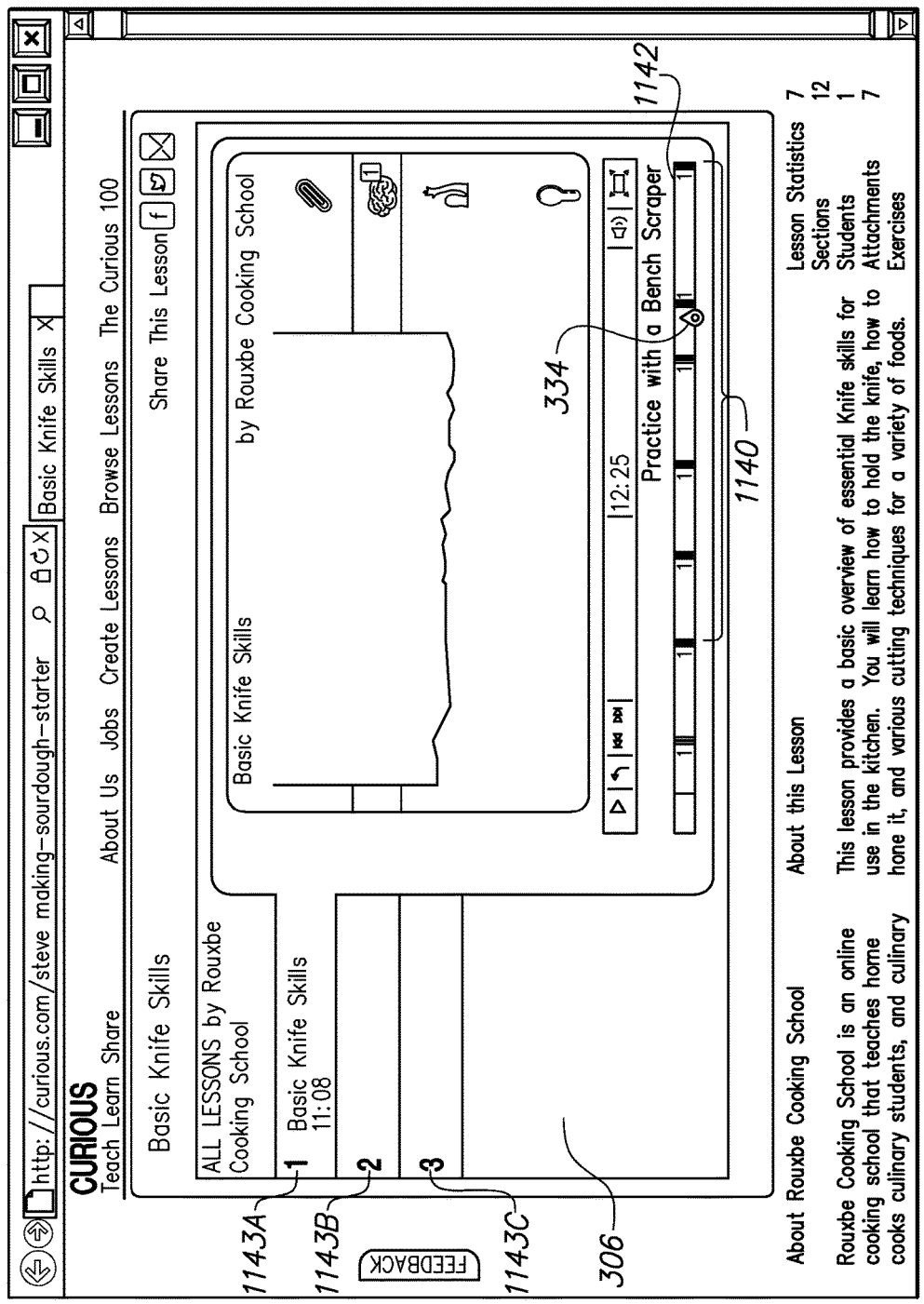
FIG. 11 illustrates a video player interface screenshot for a basic knife skills lesson according to an exemplary embodiment of the present invention.

FIG. 11 illustrates a video player interface screenshot 1100 for a basic knife skills lesson according to an exemplary embodiment of the present invention.

In FIG. 11, interface screenshot 1100 illustrates another subject matter (cooking) for a course. The course has three lessons 1143A, 1143B and 1143C. Lesson 1143A comprises seven time-coded sections 1140. As can be seen (e.g. 1142), each of the time-coded sections 1140 includes a single exercise. Progress indicator 334 shows that the video lesson is currently at a time-coded section entitled "Practicing with a bench scraper."

Figure 12:
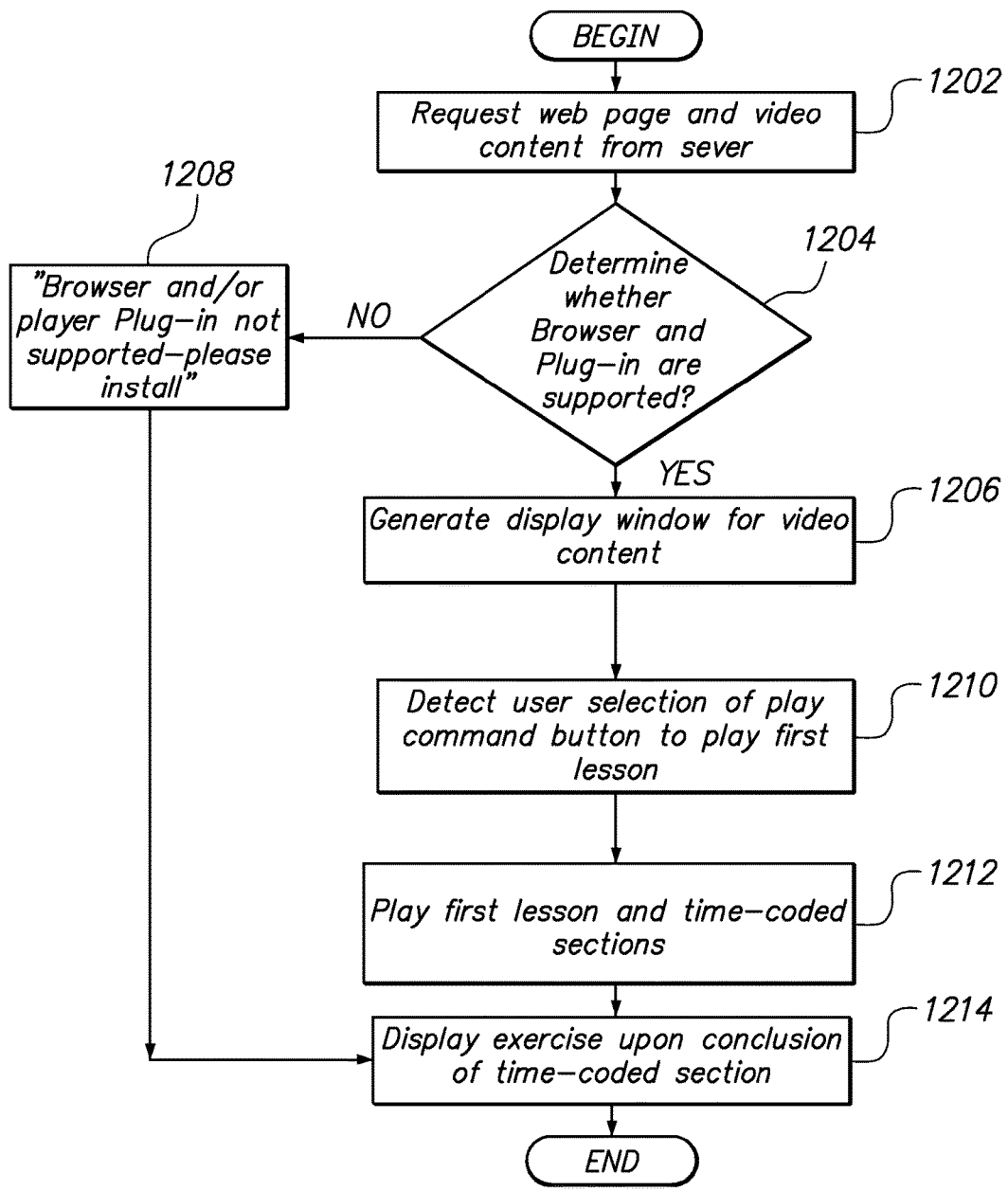
FIG. 12 is a flowchart illustrating a method for displaying video content in accordance with an exemplary embodiment of the present invention.

FIG. 12 is a flowchart illustrating method 1200 for displaying video content in accordance with an exemplary embodiment of the present invention.

At block 1202, user 102 (FIG. 1) wishing to view video content for a course, employs client laptop 105 and a browser (not shown) to transmit an HTTP request to web server 122 via Internet/Communication Network 106. Responsive thereto, web server 122 transmits a web page to client laptop 105. In one embodiment, the downloaded web page includes embedded video player 107 and other related information for playing the video content for the course. The video content might be received from web server 122 and/or video server 120.

At decision block 1204, it is determined whether the browser on client laptop 105 is supported and whether the browser includes a supported player plug-in. An example of such a player plug-in might be Shockwave Flash available from Adobe, Inc., of San Jose, Calif. If the browser and player plug-in are supported, execution proceeds to block 1206, else execution proceeds to block 1208, where a message appears within the browser display window that the player plug-in and (or the browser) are not supported and prompting the user to install the support browser and player plug-in.

At block 1206, display window 302 is generated in the web page. Display window 302 includes menu window 306 for displaying a plurality of lessons for the course and display window 304 for playing a lesson selected from menu window 306. The web page may also be populated with text, images and control buttons (e.g., 323, 316, etc.) for playing and controlling the video content.

At block 1210, user-selection of a control button to play a first lesson of the video content is detected. In one embodiment, user 102 can position a user input device over play button 312, which is centrally located within display window 304, to play the first video lesson.

At block 1212, upon user selection, the first lesson is played in display window 304. The first lesson is selectable from menu window 306, in which thumbnails for all of the lessons for the course are displayed. The first lesson is then played as a series of time-coded sections, beginning from the first time-coded section until all time-coded sections for the lesson are played.

Note that each respective time-coded section is based upon a subtopic or chapter or key concept of lesson. As discussed with reference to FIGS. 7 and 10, the first lesson might be displayed with paperclip icon 746 that allows file attachments or Internet links to be viewed, and raise hand icon 408 enabling user 102 to communicate with teachers as well as content providers.

At block 1214, upon conclusion of at least one time-coded section, the method displays a quiz or exercise that tests user 102's knowledge of the subject matter learned from the video. In this manner, user 102's knowledge of the subject matter learned is affirmed. All of the time-coded sections are then played until conclusion of the lesson. In one embodiment, the next lesson is scheduled to begin but does not commence until a play command is received. In an alternate embodiment, the next lesson automatically begins at the conclusion of a prior lesson.

Figure 13:
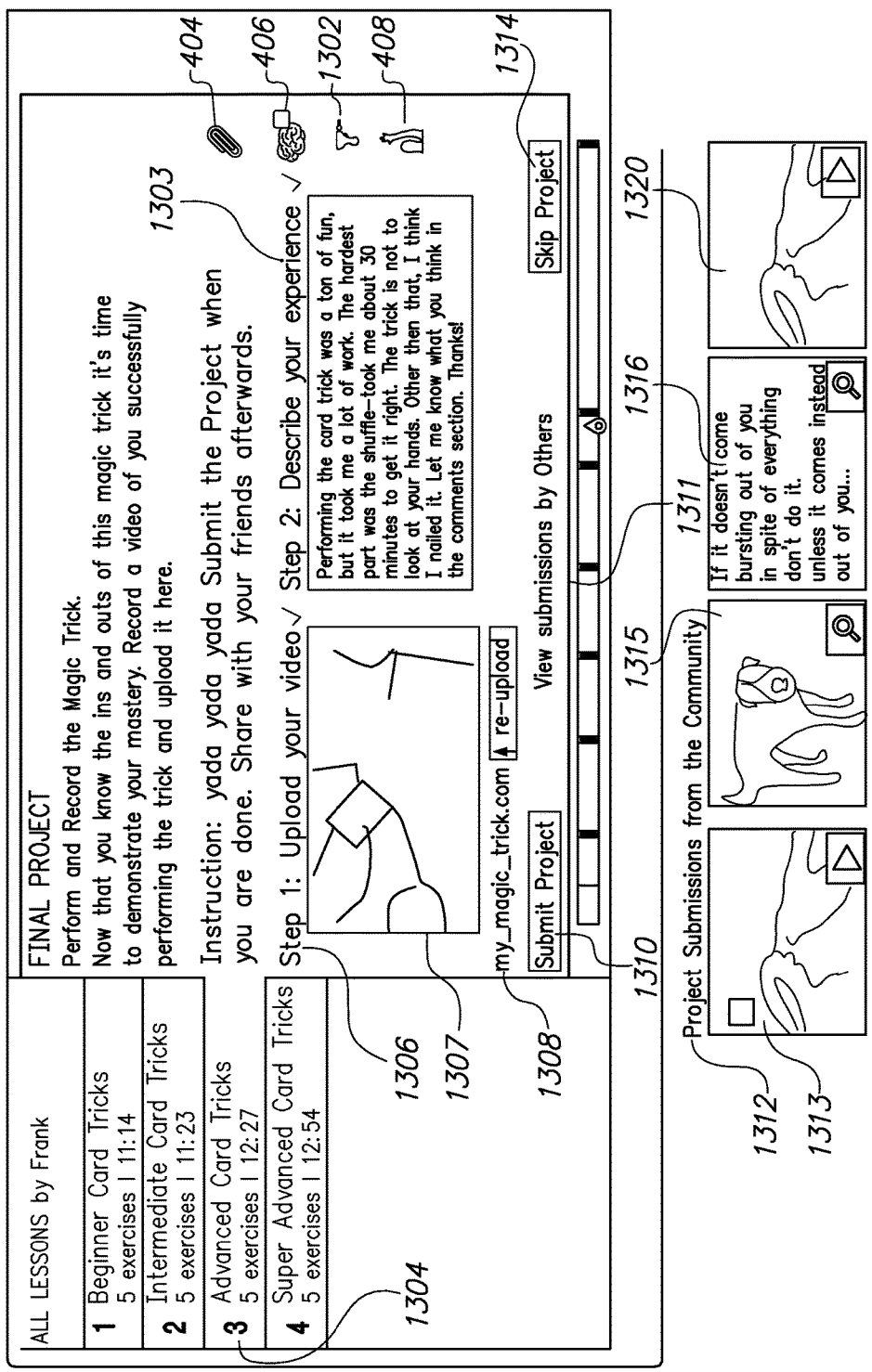
FIG. 13 illustrates a project submission interface according to an exemplary embodiment of the present invention.

FIG. 13 illustrates a submit project interface 1300 according to an exemplary embodiment of the present invention.

In FIG. 13, submit project interface 1300 shows the uploading of a final project based on a card trick lesson viewed by user 102. Here, users may be asked to upload a project upon conclusion of a lesson. In one embodiment, a project is an educational task or undertaking assigned to the student based upon the lesson viewed by the student. A project is typically supplementary to any quizzes or exercises undertaken by the student.

The project is preferably is time-limited to encourage quicker submission of the project. Although video is preferred, the project might include images, etc. that can be uploaded by the user. The project also preferably relates to subject matter of the lesson viewed. The project might be an essay, poem, demonstration of material learned or might even be an instructional video that improves upon the lesson viewed.

In one embodiment, submit project interface 1300 is accessed by selecting power screwdriver icon 1302. Power screwdriver icon 1302 is displayed adjacent to paperclip icon 404, brain icon 406 and raised hand icon 408 of FIG. 4.

Here, user 102 has been asked to upload a project based on "Advanced Card Tricks" lesson 1304. Here, user 102 begins at "Step 1" 1306 by selecting a completed project file namely project file 1308, my_magic_trick.mov. Once selected, project file 1308 can be previewed in window 1307. After previewing, at "Step 2" 1303, user 102 can then describe the user's experience.

Here, user 102's experience was positive. As shown, user 102 states that: "performing this card trick was a ton of fun, but it took a lot of work. The hard part was the shuffle—took me about 30 minutes to get it right . . . ." After describing his or her experiences, user 102 selects "submit project" button 1310 to upload the project file.

User 102 can also select "Skip Project" button 1314 to skip submission of the project or select "View Submissions by Others" 1311 to view project submissions by others. All of the projects for a lesson can be viewed here. User 102 may also view project submissions from the community 1312. Project submissions are typically videos unrelated to the subject matter of the lesson viewed by user 102. User 102 can view the project submissions by selecting video 1313, video 1315, video 1316 and video 1320.

An advantage of the present invention is that a community can be built around lessons and project submissions. The community can provide comments and replies on lessons and projects, provide praise or express feelings, and over time, activities around any one or more lessons and projects can be increase significantly, create a buzz, etc.

Figure 14A:
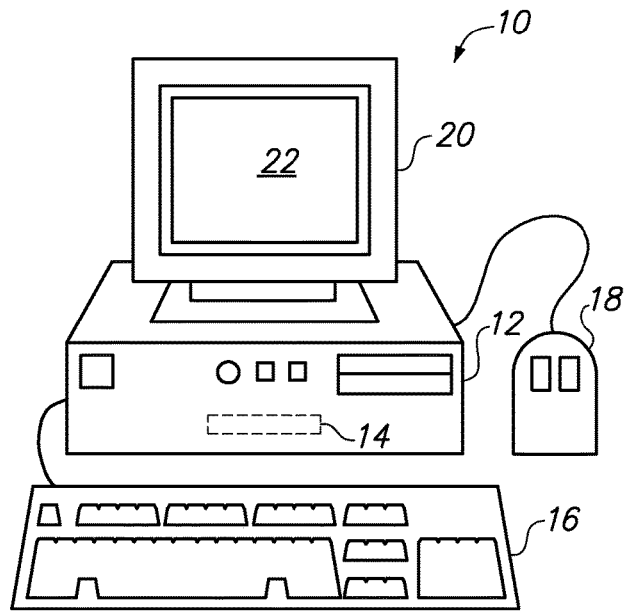
FIG. 14A shows a typical computer such as would be operated by a user on the Internet.

FIG. 14A shows a typical computer 10 such as would be operated by a user on the Internet. Computer 10 includes a cabinet 12 housing familiar computer components such as a processor, memory, disk drive, Compact Digital Read-Only Memory (CDROM), etc. (not shown). User input devices include keyboard 16 and mouse 18. Output devices include display 20 having a display screen 22. Naturally, many other configurations of a computer system are possible. Some computer systems may have other components in addition to those shown in FIG. 14A while others will have fewer components. For example, server computers need not have attached input and output devices since they may only be accessed from time to time by other computers over a network. Human interaction with such a server computer can be at another computer that is equipped with input and output devices. Input and output devices exist in many variations from those shown in FIG. 14A. Displays can be liquid crystal displays (LCD), computer monitors, plasma, etc. Input devices can include a trackball, digitizing tablet, microphone, etc. In general, use of the term "input device" is intended to include all possible types of devices and ways to input information into a computer system or onto a network. Likewise the term "output device" includes all possible types of devices and ways to output information from a computer system to a human or to another machine.

The computer itself can be of varying types including laptop, notebook, palm-top, pen-top, etc. The computer may not resemble the computer of FIG. 14A as in the case where a processor is embedded into another device or appliance such as an automobile or a cellular telephone. Because of the ever-changing nature of computers and networks, the description of hardware in this specification is intended only by way of example for the purpose of illustrating the preferred embodiment. Any distributed networked system capable of executing programmed instructions is suitable for use with the present invention.

Figure 14B:
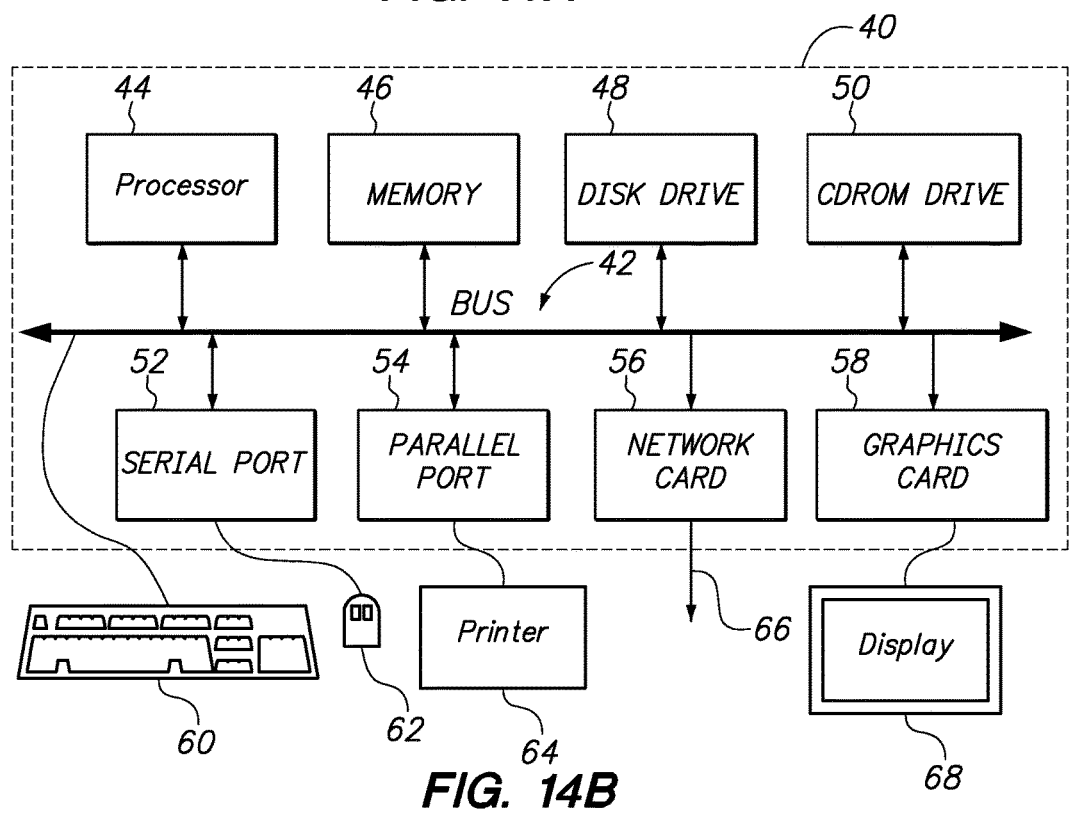
FIG. 14B shows subsystems of the computer of FIG. 14A.

FIG. 14B shows subsystems of the computer of FIG. 14A. In FIG. 14B, subsystems within box 40 are internal to, for example, the cabinet 12 of FIG. 14A. Bus 42 is used to transfer information in the form of digital data between processor 44, memory 46, disk drive 48, CDROM drive 50, serial port 52, parallel port 54, network card 56 and graphics card 58. Many other subsystems may be included in an arbitrary computer system, and some of the subsystems shown in FIG. 14B may be omitted. External devices can connect to the computer system's bus (or another bus or line, not shown) to exchange information with the subsystems in box 40. For example, devices such as keyboard 60 can communicate with processor 44 via dedicated ports and drivers (shown symbolically as a direct connection to bus 42). Mouse 62 is connected to serial port 52. Devices such as printer 64 can connect through parallel port 54. Network card 56 can connect the computer system to a network. Display 68 is updated via graphics card 58. Again, many configurations of subsystems and external devices are possible.

While the above is a complete description of exemplary specific embodiments of the invention, additional embodiments are also possible. Thus, the above description should not be taken as limiting the scope of the invention, which is defined by the appended claims along with their full scope of equivalents.

We claim:

1. A method for improved selection and navigation of video content, the method executing on a processing platform having a processor and non-transitory memory, the method comprising:

receiving by the processing platform on a user device, one or more video data files for the video content from a server, said video content comprised of at least a first video content that is a first lesson of a course and a second video content that is a second lesson of the course, the first video content and the second video content being independently selectable without playing the other, from within a lesson index area of a display window to play in a video display area of the display window;

responsive to a first user input from a user-input device to the processing platform, playing the first video content in the display window, wherein said first video content is segmented into a plurality of time-coded sections, each respective time-coded section playing a key concept of the first video content, wherein each time-coded section is associated with a video file, wherein each respective time-coded section comprises a title;

wherein playing said first video content in the display window further comprises consecutively playing each video file associated with said plurality of time-coded sections;

responsive to a second user input triggering a mouse-over event on any given time-coded section from the user-input device to the processing platform, displaying the title of the given time-coded section;

responsive to a third user input selecting a time-coded section different from the one being played, playing the time-coded section different from the one being played from the start of the time-coded section different from the one being played;

embedding the end of at least one time-coded section with a quiz or exercise associated with the key concept covered by the at least one time-coded section;

upon playing of the at least one time-coded section to a conclusion to reach said quiz or exercise embedded in said at least one time-coded section, suspending play of the first video content by displaying said quiz or exercise and awaiting a corresponding user response; and upon receiving said user response to the quiz or exercise, initiating play of the next time-coded section and subsequent time coded-sections, if any, until conclusion of the first video content; and embedding a file attachment during play of the first video content, wherein upon user selection, said file attachment is configured to be viewable by a user, wherein the embedding the file attachment comprises providing overlay animation by hanging the file attachment on the display window.

2. The method of claim 1 further comprising communicating during play of the first video content, a question to a teacher of the first video content, wherein said communication is initiated upon user selection of an interactive link.

3. The method of claim 1 further comprising displaying an interactive link during play of the first video content, wherein upon user selection, said interactive link permits a user to provide a comment, suggestion, praise or feedback.

4. The method of claim 1 further comprising displaying an interactive link during play of the first video content, wherein upon user selection, an item of interest is purchased by the user.

5. The method of claim 1 further comprising receiving, by the processing platform, a project file, said project file having video content based on the course viewed by the user.

6. The method of claim 1 wherein upon selection of said at least one time-coded segment, the key concept associated with the at least one time-coded section is played or replayed.

7. A computer program product including a non-transitory computer readable storage medium and including computer executable code for playing video content, the code when executed by a processor adapted to perform the steps comprising:
receiving one or more video data files or video content from a server, said video content comprised of at least a first video content that is a first lesson of a course and a second video content that is a second lesson of the course the first video content and the second video content being independently selectable without playing the other, from within a lesson index area of a display window to play in a video display area of the display window;
responsive to a first user input from a user-input device, playing the first video content in the display window, wherein said first lesson is segmented into a plurality of time-coded sections, each respective time-coded section playing a subtopic of the first video content and wherein said plurality of time-coded sections is configured to be played consecutively in time, wherein each time-code section is associated with a video file, wherein each respective time-coded section comprises a title;
wherein playing said first video content in the display window further comprises consecutively playing each video file associated with said plurality of time-coded sections
responsive to a second user input triggering a mouse-over event on any given time-coded section from the user-input device to the processing platform, displaying the title of the given time-coded section;
responsive to a third user input selecting a time-coded section different from the one being played, playing the time-coded section different from the one being played from the start of the time-coded section different from the one being played;
wherein the end of at least one time-coded section is embedded with an exercise associated with the subtopic covered by the at least one time-coded section;
upon playing of the at least one time-coded section to a conclusion or reaching said exercise embedded in said at least one time-coded section, suspending play of the first video content by displaying said exercise and awaiting a corresponding user response to the exercise;
upon receiving said user response to the quiz or exercise, proceeding to and playing the next time-coded section and subsequent time coded-sections, if any, until conclusion of the first video content; and
embedding a file attachment during play of the first video content, wherein upon user selection, said file attachment is configured to be viewable by a user, wherein the embedding the file attachment comprises providing overlay animation by hanging the file attachment on the display window.

* * * * *